3,600,331
CATALYST CONTAINING COPPER PHOSPHATE AND SILVER PHOSPHATE USEFUL IN THE OXYGENATION OF HYDROGEN HALIDES
Raymond W. Ingwalson, Chattanooga, Tenn., assignor to Velsicol Chemical Corporation, Chattanooga, Tenn.
No Drawing. Filed June 18, 1968, Ser. No. 737,810
Int. Cl. B01j *11/82*
U.S. Cl. 252—437     5 Claims

ABSTRACT OF THE DISCLOSURE

A catalyst composition which comprises a composite of a catalytic component of a copper phosphate and a silver phosphate and a non-catalytic refractory support. In addition, the catalyst composition can include at least one alkali metal phosphate.

---

This invention relates to novel catalyst compositions and to processes for preparing elemental halogens, particularly chlorine and bromine, and halogenated hydrocarbons which utilize such catalyst compositions to effect the oxidative decomposition of hydrogen halides.

The oxidative decomposition of hydrogen halides to produce the corresponding elemental halogen is known generally as the Deacon process and has been used for almost a century. This process basically involved decomposing hydrogen halides under oxidation conditions with an oxygen-containing gas in the presence of a catalyst. While the process because of its relative simplicity is particularly desirable for directly preparing halogens, it has not gained wide acceptance as a major source of elemental halogen competitive with electrolysis methods. This is still the case today even though the demand for halogens has sharply increased and even though there is a plentiful supply of hydrogen halide starting material produced as a by-product from various industrial processes.

The principal reason limiting wide acceptance of this process resides in the many problems associated with the catalyst used to effect the basic oxidation reaction. Since the inception of this process the standard catalyst used has been a copper-containing catalyst which under the reaction conditions exists, primarily as a halide or oxyhalide such as cupric or cuprous halide or oxyhalide. Most of the problems associated with the use of these copper-containing catalysts are caused by their relatively low activity which necessitates a relatively high temperature to effect the reaction. A high reaction temperature is particularly undesirable, however, because the conversion of the hydrogen halide decreases as the temperature increases due to the equilibrium kinetics of the oxidation reaction. A high reaction temperature, moreover, causes a volatilization of the copper-containing catalyst which results in several serious problems. Aside from the loss of the catalyst particles swept out of the reactor with the product stream, the catalyst particles tend to settle or lodge in the channels of the catalyst bed, on the reactor surfaces or in the appurtenant reactor piping. This eventually causes a plugging of the reactor which necessitates frequent and costly shutdowns to dislodge the settled catalyst particles. Many other problems are associated with the use of the copper-containing catalyst and include the formation of "hot spots," or extremely high localized catalyst temperatures within the catalyst mass which adversely effects the reactor materials, lowers product conversion, and generally shortens catalyst life. To increase the activity of the copper-containing catalyst and thus permit lower reaction temperatures with increased conversions as well as to avoid the many other problems associated with the copper-containing catalyst a wide variety of different techniques have been proposed. These techniques primarily involved modifying the copper-based catalyst by incorporating various materials into the copper-containing catalysts primarily to increase their activity or to decrease their volatility. For example, various catalytic materials such as the rare earth metals have been incorporated into the catalysts to act as a co-catalyst or promoter with the catalytic copper component while many other materials such as alkali metals have been incorporated into the catalyst to depress the freezing point of the copper and thus permit use of the catalyst in a molten state at lower reaction temperatures. While the many modifications of the copper-containing catalyst have, in certain instances, resulted in catalyst improvement, such modifications have not resulted in catalysts having all of the desired properties and especially have not resulted in catalysts having activities capable of producing high conversions at relatively low reaction temperatures.

Accordingly, an object of this invention is to provide a catalyst composition suitable for use in the oxidative decomposition of hydrogen halides to the corresponding elemental halogens. Another object is to provide a catalyst composition which is highly active and capable of effecting such oxidative reactions at relatively low temperatures with high conversions of the hydrogen halide to the corresponding elemental halogen. A further object is to provide a process for preparing elemental halogen which utilizes such catalyst compositions to effect the oxidative decomposition of the corresponding hydrogen halide. Still another object of this invention is to provide a process for preparing halogenated hydrocarbons by utilizing such catalyst compositions to supply the halogen reactant during the halogenation of the hydrocarbon by effecting the oxidative decomposition of a hydrogen halide in situ. These and other objects of this invention will be apparent from the following further detailed description thereof.

The catalyst composition of this invention basically comprises a composite of a catalytic component consisting of a copper phosphate in combination with a silver phosphate, a non-catalytic refractory support and optionally, as an additional component, at least one alkali metal phosphate. For purposes of clarity and definition the term phosphate as used herein includes the mono-, di- and tribasic orthophosphate salts, the di- and tetrabasic pyrophosphate salts, and the metaphosphate salts of the above mentioned metals; and the term copper as used herein, includes both the cuprous and cupric oxidation states of this metal. Thus, a catalyst composition of this invention can contain a specific phosphate of copper and silver or can comprise a mixture of the heretofore mentioned phosphate of copper and silver.

The quantity of the copper phosphate and the silver phosphate catalytic component in the catalyst as well as the relative proportions of the copper to the silver in the catalytic component are important factors influencing the success of the catalyst composition in effecting the oxidative decomposition of hydrogen halides with high conversions at low reaction temperatures. While the quantity of the catalytic component consisting of the copper phosphate and the silver phosphate can be varied with the specific amount used being dependent upon such factors as the presence or the absence of an alkali metal phosphate component in the catalyst, the particular hydrogen halide being decomposed, and the type of refractory support used, the total combined amount of the copper phosphate and the silver phosphate in the catalyst, calculated as free metals, should range from about 1 to about 15 weight percent of the total composite. A more limited range is generally preferred however, particularly to maximize the activity of the catalyst, and generally ranges from about 2.5 to about 10 weight percent of the total composite. The relative proportion of the copper phosphate to the silver phosphate in the catalytic component of the catalyst is also an important factor affecting the activity of the catalyst. While the relative proportion of the copper phosphate to the silver phosphate in the catalytic component can be varied, the copper and the silver, calculated as free metals, should be maintained within the ratio of from about 5:1 to about 1:5 weight parts of copper to silver, respectively. A more limited range is usually preferred, particularly to maximize catalyst activity and ranges from about 3:1 to 1:3 weight parts of copper to silver, respectively, with about equal weight parts of copper to silver being especially preferred.

As indicated, the catalyst composition of this invention can contain at least one alkali metal phosphate as a second component in addition to the catalytic component of the copper and the silver phosphates. Advantageously, the alkali metal component is employed to modify the extremely high activity of the catalyst composition to permit its use under conditions where a substantial quantity of hydrogen halide is to be converted per unit time at low reaction temperatures. The alkali metal phosphate used as the second component can include salts of such alkali metals as sodium, potassium, or lithium, with potassium being particularly preferred. When employed in the catalyst, the amount of the alkali metal phosphate present can be varied with the particular amount used being dependent upon such factors as the particular alkali metal phosphate or combination utilized, the hydrogen halide being decomposed and the quantity of the catalytic component present in the catalyst. Generally, however, the alkali metal phosphate can be present in the catalyst in a range from about 1 to about 15 weight percent of the catalyst with a more limited range from about 2.0 to about 10 weight percent usually being preferred.

The inert refractory support used as a carrier for the catalytic component of the copper and the silver phosphates and when used, the alkali metal phosphate component, can be composed of a wide variety of different adsorbent porous materials. Generally, any conventional porous carrier material which is catalytically inert and resistant to attrition under the reaction conditions employed, can be satisfactorily utilized. Because the catalyst of this invention is so highly active. Because the catalyst necessary to employ support materials having extremely high surface areas to increase catalytic activity. Consequently, relatively low surface area supports can be suitably employed, in most instances having surface areas below about 175 square meters per gram. Typically, supports which can be used include synthetic or naturally occurring inorganic oxides such as silica, alumina, zirconia, thoria, boria, magnesia, titania, or combinations thereof, such as silica-alumina, alumina-boria; materials such as pumice or fire brick; or naturally occurring clays and silicates such as diatomaceous earths, fuller's earth, attapulgites, clays, montmorillonites, or hallosites. Of the various suitable support materials, aluminas and silica-aluminas are particularly preferred. Of this latter class, a support consisting essentially of silica and alumina, particularly in substantially equal weight parts, having a relatively low surface area, below about 150 and typically below about 100 or about 80 to 100 square meters per gram is an especially preferred support material, particularly for retarding the formation of "hot spots" within the catalyst mass. Another support of this class which is also particularly preferred is a support consisting essentially of gamma alumina having the above indicated low surface area. The catalyst composite is advantageously employed in a particulate form where the finely divided particles can have various shapes and sizes which range from the particle size necessary for use in a fluidized bed to the size necessary for use in a fixed bed.

The catalyst composition of this invention can be prepared according to several different conventional procedures. One typical and suitable method involves first preparing a pre-catalyst by soaking a pre-dried support with a mixture of phosphoric acid and an aqueous acidic solution of a soluble compound of copper and the silver, for example as nitrates, and when the catalyst contains an alkali metal phosphate also with a solution of a soluble compound of the alkali metal, for example a nitrate. Other soluble compounds of one or more of the metal components besides nitrates can be suitably employed and the metal components can be deposited on the support as halides, oxides, hydroxides, carbonates or acetates. The support is retained in the solution for a period of time sufficient to adsorb the desired quantity of the respective metals on and into the support and then can be freed from any excess solution and dried. The components deposited and adsorbed onto and into the support can then be converted to the desired phosphate form by heating the composite to about 400° C. while passing nitrogen through the composite.

The catalyst composition of this invention as indicated can be utilized to prepare elemental halogens such as chlorine or bromine by catalyzing the oxidative decomposition of the corresponding hydrogen halides. This is effected according to the process of this invention by contacting the hydrogen halide with an oxygen-containing gas under oxidation conditions in the presence of the catalyst composition and thereafter recovering the elemental halogen thus produced.

The hydrogen halide which can be contacted with the catalyst composition to obtain the corresponding elemental halogen according to the process of this invention preferably comprises either hydrogen chloride or hydrogen bromide, to produce, respectively, elemental chlorine or bromine. Preferably, the hydrogen halide utilized in the oxidative decomposition should be relatively pure ranging up to 90 or more percent by weight of the hydrogen halide, especially when high conversions to elemental halogen is desired. The oxygen-containing gas which is contacted with the gaseous hydrogen halide under oxidation conditions to effect the oxidative decomposition can contain molecular oxygen in various concentrations. Generally, air is suitably used as the oxygen-containing gas when hydrogen bromide is being decomposed while a gas richer in oxygen ranging up to as high as 80 to 100 volume percent of molecular oxygen is usually preferred for the decomposition of hydrogen chloride. The proportion of oxygen to the hydrogen halide used in the oxidation reaction is not overly important and can be widely varied. It is generally desirable, however, especially to obtain high conversions at relatively low reaction temperatures to use an excess of the oxygen above the amount stoichiometrically required to effect the reaction. Thus, while 0.25 mol of oxygen is theoretically required to convert one mol of the hydrogen halide to the corresponding elemental halogen, it is usually desirable to use an amount of oxygen above 0.25 mol per mol of hydrogen halide, ranging up to as high as about 2.5 mols of oxygen per mol of hydrogen halide with about 0.3 to about 1.9, or preferably about 0.3 to about 1, mols of oxygen per one mol of hydrogen halide being suitably employed in most instances.

The oxidation conditions of temperature and pressure utilized to effect the oxidative decomposition can be varied depending upon a number of factors such as the particular catalyst composition used, the hydrogen halide undergoing decomposition and the procedure used to effect the process. Generally, the temperature employed for the oxidative decomposition of hydrogen chloride can range from about 300° to about 500° C., however, a preferred reaction temperature for hydrogen chloride is within the range of from about 375° C. to about 425° C. The high activity of the catalyst of this invention is even more dramatically illustrated by the low temperatures which can be employed to effect the conversion of hydrogen bromide. This low temperature range for the decomposition of hydrogen bromide can be as low as from about 175° C. to about 350° C. with a more limited range of from about 200° C. to about 300° C. being particularly preferred.

The pressures used in association with the above temperatures to effect the process can be varied. While atmospheric pressure is suitably used in most instances, particularly to maintain the reactants in a vaporized state, an elevated pressure ranging up to as high as 10 atmospheres or more can be advantageously employed in certain instances to increase the conversion rate and to assist in recovery of the elemental halogen in liquid state.

The quantity of the catalyst employed in the process can be widely varied with the particular amount used being dependent upon such factors as the particular catalyst, the hydrogen halide being decomposed, the oxidation conditions employed as well as the particular reaction rate desired. The quantity of the catalyst, moreover, is also related to or is a function of the time or residence period that the halide and oxygen-containing gas must be in reactive contact with the catalyst to achieve the desired degree of conversion. The quantity of the catalyst as well as the residence period are best described in terms of the space velocity especially when operating the process on a continuous basis. Generally, when operating the process under the conditions set forth above, the combined feed stream of oxygen-containing gas and hydrogen halide can be contacted with the catalyst at a combined gaseous hourly space velocity within the range of from about 10 to about 1500 with a range of from about 75 to about 1000 usually being preferred. As used herein, the term gaseous hourly space velocity (GHSV) is defined as the volume of the reactants as measured at standard temperature and pressure per volume of catalyst per unit time.

The process for preparing elemental halogens utilizing the catalyst composition of this invention to effect the oxidative decomposition of corresponding hydrogen halides can be conducted in a batch or continuous type procedure. A continuous procedure is preferred, however, and a typical illustrative procedure for the oxidative decomposition of hydrogen chloride to elemental chlorine involves charging a vaporized feed stream of hydrogen chloride and an oxygen-containing gas, such as oxygen, adjusted to the desired ratio of oxygen to hydrogen chloride to a reaction zone and into reactive contact with the particulate catalyst composition, for example, a composite of a catalytic component consisting of silver phosphate and copper phosphate carried on a support consisting essentially of alumina. The finely divided catalyst composition can be maintained within the reaction zone at the desired oxidation temperature and pressure either as a fixed or fluidized bed, with the fixed bed generally being preferred. The rate of the gas reactants through the reaction zone is adjusted to provide the desired space velocity and the continuous effluent exiting from the reaction zone is continuously treated to recover the elemental chlorine contained therein using conventional procedures such as condensation and distillation. Any excess oxygen-containing gas as well as any unconverted hydrogen halide remaining in the effluent after removal of the elemental halogen, in this case chlorine, can be recycled to supply a portion of the feed stream charged to the reaction zone.

The catalyst composition of this invention as indicated can be utilized to prepare halogenated hydrocarbons, particularly chlorinated or brominated hydrocarbons by effecting the oxidative decomposition of a hydrogen halide to supply the halogen reactant in situ during the halogenation of hydrocarbons. This is achieved according to this invention by contacting a hydrocarbon with a hydrogen halide and an oxygen-containing gas at oxidation conditions in the presence of the catalyst composition and thereafter recovering the halogenated hydrocarbon thus produced. The hydrocarbons which can be halogenated according to the process include most halogenatable aliphatic, alicyclic and aromatic hydrocarbons, which are volatile at the oxidation temperature utilized for the halogenation. Examples of typical hydrocarbons include alkanes having from one to about five carbon atoms such as methane, ethane, propane, or butane; alkenes having from two to about six carbon atoms such as ethylene, propylene or butylene; cycloalkanes or cycloalkenes having from five to about seven carbon atoms such as benzene and lower alkyl substituted benzenes such as toluene, ethyl benzene or xylenes. The hydrogen halide used in the process preferably comprises either hydrogen chloride or hydrogen bromide and when utilizing such hydrogen halides, typical halogenated hydrocarbons obtainable in the process include such compounds as vinyl chloride, ethylene dichloride, vinyl bromide, chlorobenzene, dichlorobenzene, or bromobenzene.

The conditions and procedures used in the process of the invention for preparing halogenated hydrocarbons can be widely varied with those conditions and procedures conventionally employed for oxyhalogenation reactions being suitably utilized in most instances. In general, the conditions and procedures are similar to those used in the preparation of elemental halogens with the major deviation being the presence of the hydrocarbon to act as a recipient of the halogen as it is liberated from the hydrogen halide. Accordingly, the conditions and procedures as set forth above for the oxidative decomposition of hydrogen halides can be readily adapted so as to effect the oxidative decomposition of the hydrogen halide in the presence of the hydrocarbon to be halogenated.

The oxygen-containing gas used in the process can, as in the process for producing elemental halogen, contain a variable concentration of molecular oxygen, and in most instances, air can be suitably utilized. The relative proportions of the oxygen-containing gas, the hydrogen halide and the hydrocarbon employed for the reaction, can be widely varied with the particular proportions chosen being dependent upon such factors as the particular hydrocarbon being halogenated, and whether the halogenated product is desired as a mono-, or polyhalogenated product. Generally, however, the proportions used should at least be stoichiometric and preferably in excess of the stoichiometric proportions required to obtain the particular degree of halogenation desired.

The catayst composition used in the process, as in the process for producing elemental halogens, will have the catalytic component of the copper and the silver as phosphates and, when used, the alkali metal component as phosphates. The quantity of the catalyst used can be varied and the particular amount employed is dependent upon several factors such as the particular catalyst used, the particular oxyhalogenation reaction, the particular reaction conditions, and desired reaction rate. Again, as in the process for preparing elemental halogens, the quantity of catalyst and residence time of the reactants are interrelated and are best expressed in terms of a space velocity when operating the process on a continuous basis. Generally, the space velocity for a combined vaporized feed stream of hydrogen halide, oxygen-containing gas and hydrocarbon will range from about 100 to 1000.

The oxidative conditions of temperature and pressure used to effect the decomposition of the hydrogen halide to supply the halogen reactant in situ can be varied depending upon such factors as the particular hydrocarbon reactant, the hydrogen halide, and the catalyst composition. Generally, the temperature can range from about 100° C. to about 500° C., with the particular temperature employed within this range being primarily dependent upon the particular hydrocarbon being halogenated and the degree of halogenation desired. For example, when halogenating alkanes such as methane, the temperature can range from about 200° to 400° C. and when halogenating alkenes, such as ethylene, and aromatics such as benzene, the temperature can range from about 150° to 350° C. While atmospheric pressure is preferred for the reaction in association with the above temperature ranges, it may be desirable in certain instances to use superatmospheric pressures ranging up to 10 or more atmospheres.

The process for preparing halogenated hydrocarbons utilizing the catalyst composition to effect the in situ formation of the halogen reactant by the oxidative decomposition of a hydrogen halide can be conducted in either a batch or continuous type procedure. A continuous procedure is preferred however, and one illustrative procedure for preparing chlorinated hydrocarbons typically involves charging a vaporized feed stream of the hydrocarbon, hydrogen chloride and an oxygen-containing gas, preferably oxygen, to a reaction zone and into reactive contact with the finely divided catalyst composition, for example, a catalyst composition consisting of a composite of a catalyst component of silver phosphate and copper phosphate carried on a support consisting essentially of alumina. The catalyst is maintained in the reaction zone at the desired oxidation temperature and pressure either as a fixed or fluidized bed with a fixed bed generally being preferred. The rate of the feed stream charged to the reaction zone is adjusted to provide the desired space velocity and the continuous effluent from the reaction zone is continuously treated such as by distillation to recover the desired chlorinated hydrocarbon. Any remaining excess oxygen-containing gas and hydrogen chloride as well as any unreacted hydrocarbon remaining in the effluent can be recycled to supply a portion of the feed stream.

The following examples are offered to illustrate the catalyst composition of this invention and the processes utilizing such catalyst composition to effect the oxidation of hydrogen halides. It is not intended, however, to limit the invention to the particular catalyst or processes illustrated therein.

EXAMPLE 1

A catalyst was prepared and was used to convert hydrogen chloride to elemental chlorine according to the following procedure:

Catalyst A

About 1500 grams of a pelletized solid support consisting essentially of silica and alumina was dried at 150° C. for about 15 hours. This support had the following characteristics.

| Composition: | Wt. percent |
|---|---|
| Silica | 52.9 |
| Alumina | 45.0 |
| Titanium oxide | 1.7 |
| Ferric oxide | 0.5 |
| Sodium oxide | 0.05 |
| Potassium oxide | 0.05 |

Physical properties

| | |
|---|---|
| Surface area _____M²/gr__ | 95 |
| Bulk density _____gr./cc__ | 0.78 |
| Pore volume _____cc./gr__ | 0.25 |
| Pellet diameter _____inch__ | 0.15 |

A pre-catalyst was prepared by charging 1273 grams of the dried, pelletized support to a vessel containing a solution of 363 grams (1.51 mols) of hydrated copper nitrate, 150 grams (0.88 mol) of silver nitrate, 15 cc. of concentrated nitric acid, 234 grams (2.03 mols) of 85% phosphoric acid and sufficient water to result in a total of 1700 grams of solution. The vessel was sealed and a vacuum periodically applied in a cycle of two hours to force the solution into the pores of the support. The treated support was separated from the solution by filtration (net weight, 2076 grams) and dried at 150° C. for about 15 hours. The dried catalyst composite had a total weight of 1584 grams constituting a weight increase of 311 grams. The metal content of the pre-catalyst composite calculated as free metal, on a weight percentage basis, was as follows.

| Metal component: | Calculated metal content |
|---|---|
| Copper | 2.85 |
| Silver | 2.85 |

The preparation of the catalyst composite was completed by charging about 1313 grams of the catalyst, constituting a volume of 1385 cc. to a catalyst bed section of a reactor and then heating the catalyst in the presence of nitrogen gas at atmospheric pressure to a temperature of about 375° C. The reactor used consisted of a vertical glass reaction tube having an inside diameter of 34 mm. and was heated externally by resistance wires. A movable thermocouple was located in the catalyst bed and the maximum temperature, found by movement of the thermocouple along the bed, was recorded as the reaction temperature. After the catalyst preparation was completed, the flow of oxygen and hydrogen chloride was begun with the rate adjusted to obtain the desired space velocity (GHSV) to effect the oxidative decomposition of the hydrogen chloride to elemental chlorine. The gases exiting from the top of the column were condensed by cooling and the chlorine thereafter recovered by distillation.

Conversion was determined by sampling the exit gas stream at the top of the hot column and absorbing it in KI solution. The free iodine was titrated with 0.1 N sodium thiosulfate and the acidity was titrated with 0.1 N NaOH using phenolphthalein. The results of the run, as well as the conditions employed, are summarized in Table I below.

EXAMPLE 2

Another catalyst of this invention was prepared and was used to convert hydrogen chloride to elemental chlorine according to the following procedure:

Catalyst B

Phosphoric acid (234 grams; 85% assay) was added to a solution of hydrated copper nitrate (363 grams), silver nitrate (150 grams), potassium nitrate (153 grams) and concentrated nitric acid (21 grams) in water (779 grams). The resulting solution was used to impregnate 1273 grams of pre-dried pelletized support consisting essentially of silica and alumina having similar properties to those detailed in Example 1. The pellets were then dried in a forced air oven at about 150° C. resulting in a dried catalyst composite having a total weight of 1681 grams. The metal content of the catalyst composite calculated as free metal, on a weight percentage basis, was as follows.

| Metal component: | Calculated metal content |
|---|---|
| Copper | 3.07 |
| Silver | 3.07 |
| Potassium | 1.9 |

The preparation of the catalyst composite was completed by charging about 1334 grams of the catalyst having a volume of 1345 cc., to a catalyst bed section of a reactor and then heating the catalyst in the presence of nitrogen gas to a temperature of about 400° C. for a period of about ½ hour. After the catalyst preparation was completed, the flow of oxygen and hydrogen chloride was begun with the rate adjusted to 2 grams per minute of hydrogen chloride and 1230 cubic centimeters per minute of oxygen resulting in the oxidative decomposition of hydrogen chloride to chlorine. The results of the run, as well as the conditions employed are summarized in Table I below:

TABLE I

| Catalyst | A | B |
|---|---|---|
| Conversion, percent | 90 | 90 |
| Temperature, °C | 400 | 400 |
| Oxidizing gas | Oxygen | Oxygen |
| GHSV: | | |
| HCl | 54.8 | 54.8 |
| O₂ | 54.9 | 54.9 |
| Total | 109.7 | 109.7 |
| Mol ratio: O₂/HCl in feed | 1 | 1 |
| Reactor residence time, seconds at reaction temperature | 7.4 | 7.4 |

EXAMPLE 3

The catalysts of this invention can also be used to convert hydrogen bromide to elemental bromine according to the following procedure.

Using the general procedure of Example 1 a catalyst composition is prepared corresponding to the composition of Catalyst A. After the catalyst preparation is complete, the flow of hydrogen bromide and oxidizing gas is begun according to the general procedure of Example 1 to effect the conversion of hydrogen bromide to elemental bromine.

EXAMPLE 4

The catalysts of this invention can also be used to prepare halogenated hydrocarbons according to the following procedure:

Using the general procedure of Example 2 a catalyst composition is prepared corresponding to Catalyst B. After the catalyst is prepared, the flow of the hydrogen chloride and oxidizing gas is begun according to the general procedure of Example 2. A vaporized stream of benzene is then simultaneously charged to the reactor to interreact with the liberated chlorine and form chlorinated benzenes.

I claim:

1. The catalyst composition consisting essentially of copper phosphate and silver phosphate in an amount of from about 1 to about 15 weight percent of the catalyst composition and in a ratio of from about 5:1 to 1:5 weight parts of copper to silver, respectively, calculated as free metal, and as an additional component an alkali metal phosphate which is present in an amount of from about 1 to about 15 weight percent of the compositon and a non-catalytic refractory support.

2. The catalyst of claim 1 wherein the alkali metal phosphate is present in an amount of from about 2 to about 10 weight percent of the composition.

3. The catalyst of claim 1 wherein the copper phosphate and silver phosphate constitute from about 2 to about 10 weight percent of the composition and the copper phosphate and the silver phosphate are present within the range of from about 3:1 to 1:3 weight parts of copper to silver, respectively, calculated as free metals.

4. The catalyst of claim 1 wherein the refractory support consists essentially of alumina.

5. The catalyst of claim 1 wherein the refractory support consists essentially of silica and alumina.

References Cited

UNITED STATES PATENTS 2,412,229   12/1946   Schaad _____ 252—437X

PATRICK P. GARVIN, Primary Examiner

U.S. Cl. X.R.

23—216, 219; 260—650R, 659A

PO-1050
(5/69)

UNITED STATES PATENT OFFICE
CERTIFICATE OF CORRECTION

Patent No. 3,600,331      Dated August 17, 1971

Inventor(s) Raymond W. Ingwalson

It is certified that error appears in the above-identified patent and that said Letters Patent are hereby corrected as shown below:

Column 3, line 57 delete ". Because the catalyst" and in place thereof insert -- ,however, it is not --.

Signed and sealed this 14th day of March 1972.

(SEAL)
Attest:

EDWARD M. FLETCHER, JR.
Attesting Officer

ROBERT GOTTSCHALK
Commissioner of Patents